United States Patent [19]
From

[11] 3,762,072
[45] Oct. 2, 1973

[54] APPARATUS FOR THE INDIVIDUAL AND AUTOMATIC MONITORING OF REPLIES GIVEN UNDER EXAMINATION

[75] Inventor: Joseph From, Brussels, Belgium

[73] Assignee: S.A. Lerali, Luxemburg, Luxembourg

[22] Filed: July 16, 1971

[21] Appl. No.: 163,298

Related U.S. Application Data

[63] Continuation-in-part of Ser. No. 759,149, Sept. 11, 1968, abandoned, and a continuation-in-part of Ser. No. 102,428, Dec. 24, 1970, abandoned.

[52] U.S. Cl. ............................................... 35/48 R
[51] Int. Cl. ............................................. G09b 5/00
[58] Field of Search ................. 35/48 R, 48 B, 9 R, 35/9 B

[56] References Cited
UNITED STATES PATENTS
3,199,230   8/1965   Sylvester et al. .................... 35/48 R
3,300,876   1/1967   Johannsen ......................... 35/48 R X

FOREIGN PATENTS OR APPLICATIONS
61,137   4/1968   Germany .............................. 35/9 B

*Primary Examiner*—Wm. H. Grieb
*Attorney*—Eric H. Waters et al.

[57] ABSTRACT

Apparatus is provided for monitoring the responses to questions posed to a group of persons under examination. The apparatus includes at least three stations for each person so that "multiple choice" type questions may be accommodated. The Examiner is provided with a control device that is electrically connected to each of the stations of each of the persons under examination. The device can simultaneously indicate selectively the responses of each of the persons under examination at respective corresponding stations. The responses are indicated by an illuminating device electrically coupled with the Examiner's control device.

6 Claims, 5 Drawing Figures

APPARATUS FOR THE INDIVIDUAL AND AUTOMATIC MONITORING OF REPLIES GIVEN UNDER EXAMINATION

CROSS RELATED APPLICATION

This application is a continuation-in-part application of my earlier Application Ser. No. 759,149 filed Sept. 11, 1968 and Ser. No. 102,428 filed Dec. 24, 1970, both now abandoned.

FIELD OF INVENTION

This invention relates to educational apparatus and like communicational devices and more particularly to apparatus for monitoring replies, answers, responses and the like.

SUMMARY OF INVENTION

An object of the present invention is to provide an apparatus for the automatic and individual monitoring of replies given to questions posed during an examination to which several persons are being subjected.

The apparatus comprises a panel displaying light signals which are visible to the examiner (e.g. teacher, professor, lecturer, etc.) and possessing, for each person under examination, a series of at least three stations which may, for example, be illuminated to indicate the response or responses given to the question or questions posed.

For each person under examination the apparatus includes a set of contactors of which one or several are operated by the person examined in order to give the reply or replies that the person assumes to be correct.

For the examiner, the apparatus contains a differentiation system which acts either before or after the replies have been given by the persons under examination so that each reply registers on one of the stations on the panel and is dependent on a predetermined code, for example a light signal, so that the correct reply or replies can be immediately distinguished from the incorrect reply or replies on the panel by a series of stations. The apparatus also contains a suitable means for retaining the signals given by the panel.

The number of stations $n$, provided for in each series, which number may not be less than three in order to prevent a person under examination from giving a reply by making a haphazard choice between two possibilities, will be such as to allow the posing of question to one to $n$ persons under examination. The number of sets of contactors corresponds to the number of persons which maybe put under examination. Moreover, in order to indicate his choice, each person under examination will operate at a maximum $2n$ of the set of contactors which is at his disposal.

On the other hand, the set of contactors may be operated directly or remotely by the person or persons under examination in such a manner that each reply made may be cancelled by the person or persons under examination. 106 correct To achieve this, the contactors, which may be current relays or switches or the like are connected by control wires which function mechanically, magnetically or electromagnetically and are at the disposal of each person under examination. To avoid a complexity of different connections, the contactors can be operated as a wireless control. Control signals may thus be transmitted by radio waves or by ultrasonic techniques.

When radio waves are used as the means of control each person under examination should be provided with either a transmitter with four wavebands or four transmitters functioning on one wavelength, these transmitters being tuned to one or several receivers.

In order that each person examined to be able to cancel one or several proposed, each person has at his disposition a system of contact breakers which permit him to override the contact or contacts previously made. To achieve this, a single contact breaker can be provided for all the individualized contactors or a contact breaker can be provided for each contactor, and these contactors may themselves be operated in the opposite sense to serve as contact breakers.

In the most simple form, the system of differentiation which is at the disposal of the examiner is controlled by a set of contactors comprising a number $n$ of contactors allowing the examiner to interject into the circuits between the contactors put at the disposition of the persons under examination and the signals on the stations of the panel, to control the conditions which may be established at the stations so that, for example, the correct reply or correct replies may be indicated. The number of these correct replies may vary from zero to $2n$.

The system of differentiation may also be controlled by punched cards or transparencies or any other system carrying the correct replies or correct reply.

By means of this system of differentiation, the Examiner changes the light of the answers selected by each person under examination in such a way that each answer given appears under a different aspect on the panel depending on whether, for example, it is correct or incorrect.

Moreover, this system may be adapted for the automatic monitoring of the orientation of a group of replies from persons under examination. To achieve this, the system of differentiation comprises circuits independent of each other, each of these circuits allowing the differentiation of stations by the lines which they form on the panel.

The line of stations represent, in the case where the stations of persons under examination are placed in a row, the attitude of a reply given to a question by the group of persons under examination.

The system of differentiation functions in such a way that every reply given registers on one of the stations of the panel in accordance with a predetermined code, for example, by use of a two colored signal system to distinguish immediately on the panel on the one hand, by a row of stations, the correct reply or replies from the incorrect reply or replies given by a single person under examination and, on the other hand, by a line of stations or by the question posed, the total of correct replies from the total of incorrect replies given by a group of persons under examination.

The predetermined code may be a two colored lighting system or a lighting system of differing intensities.

The panel may also contain, for each series of stations a counter which simply totals the correct replies from each person under examination or which totals the points awarded to each one of these.

Many applications can be found for the apparatus of the present invention such as an instrument of teaching for subjecting the pupils of a class to an examination, or for testing persons before they are subjected to an aptitude test.

As an instrument of instruction, the apparatus includes, advantageously, a set of contactors for each pupil and for the teacher, as well as a signal light panel, for example green for the correct replies and red for the incorrect replies. The panel being visible by the teacher contains under the name of each pupil a certain number of signal lamps as well as a counter for the correct replies or points awarded.

In order to make a rapid check of the effectiveness of his lecture, the teacher can proceed with, when he wishes, a simultaneous questioning of all the pupils, and the illumination in red or green of each of the replies given enables the teacher immediately to detect the pupils who have been inattentive or who are backward. He can keep the signals illuminated just as long as he wishes and he can on the other hand have recourse to individual counters for the correct answers for all the questions during the course of a lesson or during periodic examinations. On the other hand, if he so desires, he can after each period of questioning for example attribute a certain number of points which can be added to or subtracted from those already awarded.

The possibility of being able to examine simultaneously a whole group of persons and to immediately distinguish the correct and incorrect replies made by each person constitutes an appreciable gain in time by reference to oral individual examination or by written examination of a group of persons. This apparatus permits therefore, in a given time, to provide for many more interrogations or questionings per person.

DETAILED DESCRIPTION

For reasons of simplification of the description and of the drawing the circuits have been limited to two persons under examination, E1 and E2.

Each of these persons has at his disposition a group of four contactors indicated as E1,1, E1,2, E1,3, E1,4, and E2,1, E2,2, E2,3, E2,4, each connected to an independent circuit, indicated as C1,1, C1,2, C1,3, C1,4, and C2,1, C2,2, C2,3, C2,4. Two lamps of different colors, for example, one green, and the other red, are connected into these circuits. These circuits may be closed by the changeover switches, $P_1$, $P_2$, $P_3$, $P_4$ which it should be noted are at the disposal of the examiner. The number of changeover switches forming the different circuits of differentiation are at least equal to those of the contactors put at the disposition of the persons under examination.

By operating the changeover switch $P_1$, the examiner closes the circuits C1,1, and C2,1, by operating the changeover switch $P_2$, he closes the circuits $C_{1,1}$ and $C_{2,1}$ The change over switch $P_1$ may therefore, depending on the choice of the Examiner, make contact with all the first line stations showing green or make contact with all the first line of stations showing red. It is clearly understood that the stations will be illuminated if the corresponding contactors have been operated by the person under examination, i.e., if a reply has been given.

The examiner closes the circuits of differentiation in such a way that one of the lamps of each circuit lights so as to indicate the reply, for example, in green if this is correct in red if the reply made is incorrect. So, supposing that the Examiner poses a question to which he suggests four replies of which only one is correct, for example, the first, the persons under examination would use contactors E1,1, and E2,2, in the case of a correct selection and would thus allow the circuits to be illuminated. When the examiner wishes to obtain the results to a question, he makes use of the changeover switch $P_1$, and green lamps of circuits C1,1, and C2,1, would be illuminated. If one of the persons under examination has operated another contactor, for example, E1,3 the examiner by using the changeover switch $P_3$, would light up the red lamp of circuit C1,3, which would indicate an incorrect choice.

With the system of differentiation of the present invention, the number of replies given to a question, has no limit; in effect, it is possible to foresee the case where the persons examined could use as many contactors as it is considered necessary to indicate all the correct replies required. This way there would appear on the panel one or several lines of illuminated stations whose general appearance would constitute a useful indication of the degree of knowledge of the persons under examination.

Since as many circuits of differentiation as contactors put at the disposition of each person under examination can be provided, the number of replies may, for example, be equal to $2n$ possible combinations of $n$ taken from $p$ to $p$, $n$ being the number of contactors per person examined 1. Further, the total absence of any reply may be considered as expression of a choice.

Figure 1:
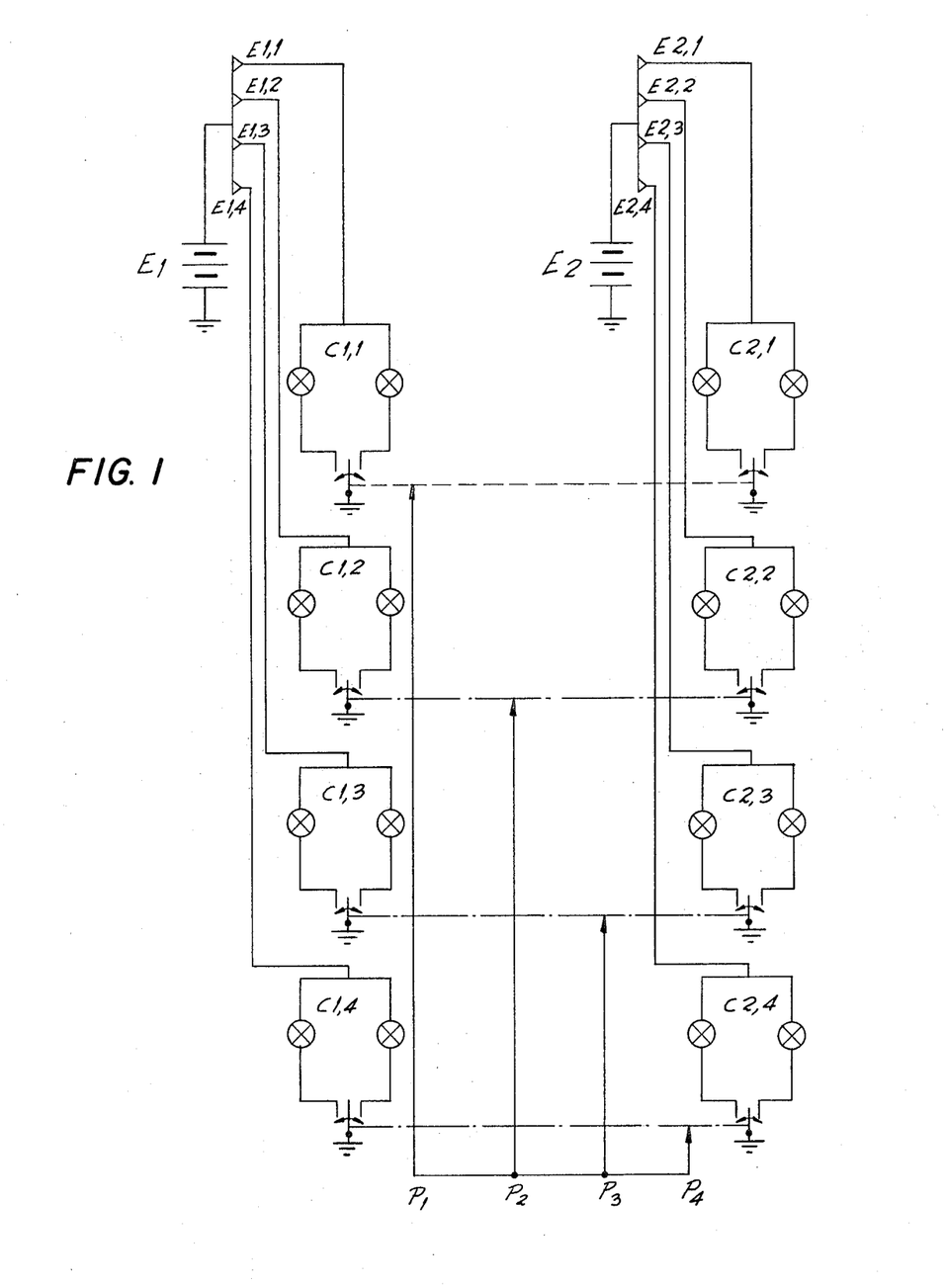
FIG. 1 is an overall schematic of the present invention.
Figures 2, 3:
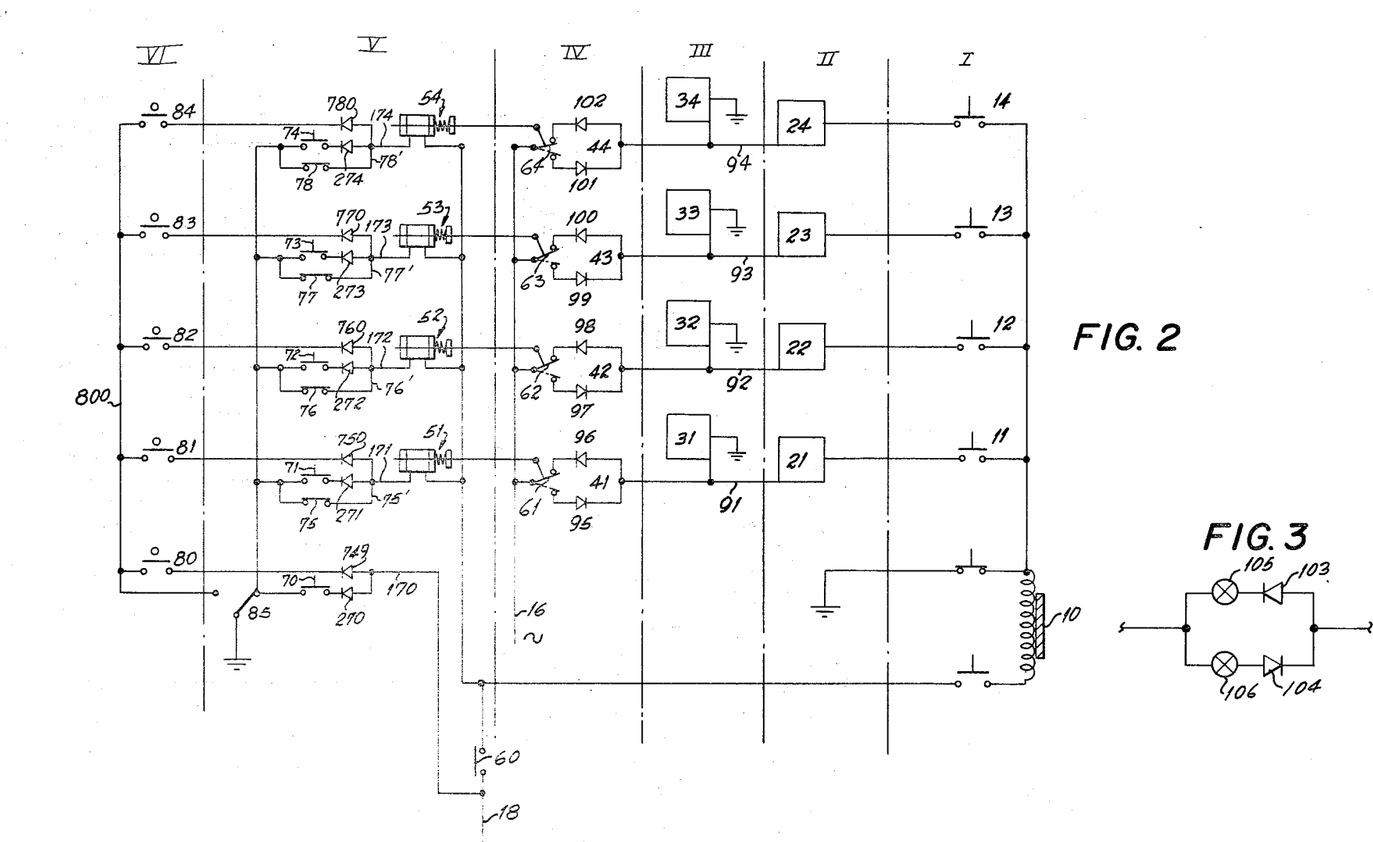
FIG. 2 is a schematic diagram of the present testing and display apparatus.
FIG. 3 is a schematic diagram of one of the blocks in FIG. 2.

In the layout according to FIG. 2, column I represents a student's transmitter set comprising a series of push buttons 11, 12, 13, and 14 for selectively $a$, an alternating-current source 10 to a corresponding series of signalling devices 21, 22, 23, and 24 shown diagrammatically in column II and appropriate for use by the student following a code predetermined by the examiner for answering questions set by the latter to the whole class. The code for the answers given by the students can be selected at the instructor's discretion, among the letters of the alphabet, for example $a$, $b$, $c$, $d$, and their combinations such as ab, ac, ad, bc, bd, cd, abc, abd, acd, bcd, abcd, etc. will correspond to one or more questions put to the class by the instructor.

Obviously, such a code can be chosen in any other way, for example, with figures or any other suitable symbols. The code will be indicated on each student's transmitter set (FIG. 4) where it is made up of the numbers 1, 2, 3, 4.

Each of the signaling devices 21, 22, 23, 24 (FIG. 2, Column II) connected on the one hand with the contactors 11, 12, 13, and 14 respectively of each of the students (Column I) is connected on the other hand by the leads 91, 92, 93, and 94 to identical signaling devices 31, 32, 33, 34 (FIG. 2, Column III), which in turn are grounded and connected to diode directional selector devices 41, 42, 43, and 44 in Column IV and controlled respectively by changeover contactors 61, 62, 63 and 64 connected to the source of current by a common lead 16. Each of the diode directional selector devices is provided with a pair of parallel diodes connected in opposing directions such as 95 and 96 in device 41; 97 and 98 in device 42; 99 and 100 in device 43; and 101 and 102 in device 44.

With reference to FIG. 3, the identical signaling devices 21, 22, 23, 24 and 31, 32, 33, 34 each comprise two diodes 103 and 104 connected in the opposite direction and in series with respective lamps 105 and 106 of different colors, for example, red and green. Each diode and lamp series circuit is connected in parallel with another diode and lamp series circuit, with the diodes connected in opposite directions.

The instructor has at his service for all the students a series of push buttons 71, 72, 73, 74 shown diagrammatically in Column V of FIG. 2, which can also be used according to the code a, b, c, d. These push buttons are located in circuits 171, 172, 173, 174, respectively, which are connected between the source of current 10 and ground through a reversible switch 85.

Each of these circuits further comprises a diode 271, 272, 273, 274 and a series switch 51, 52, 53 and 54, respectively. The switches 51, 52, 53 and 54 control commutators or double pole switches 61, 62, 63 and 64, respectively, of the diode changeover devices 41, 42, 43 and 44 in Column IV.

Further, as shown in Column V (FIG. 2), the instructor also makes use of push buttons 75, 76, 77 and 78 which connect him respectively through the leads 75', 76', 77' and 78' and diodes 750, 760, 770 and 780 as well as through the contacts 81, 82, 83 and 84 to a light-projection device 800 located in Column VI.

Further, the instructor has at his disposal in Column V a switch 70 mounted in a circuit 170 comprising a diode 270 linking said circuit to a lead 18 from the station of the following student, the lead 18 being connected, further, to the source of current 10 through a contact 60. When the circuit 170 is connected through a forward biased diode 749 and a contact 80 to the projecting device 800, the device 800 can also be grounded by the switch 85, which serves to ground the circuits 170, 171, 172, 173 and 174. The diodes 271, 750, 272, 760, 273, 770, 274, 780 are especially put in the circuit for avoiding the inversion of the current.

Figure 4:
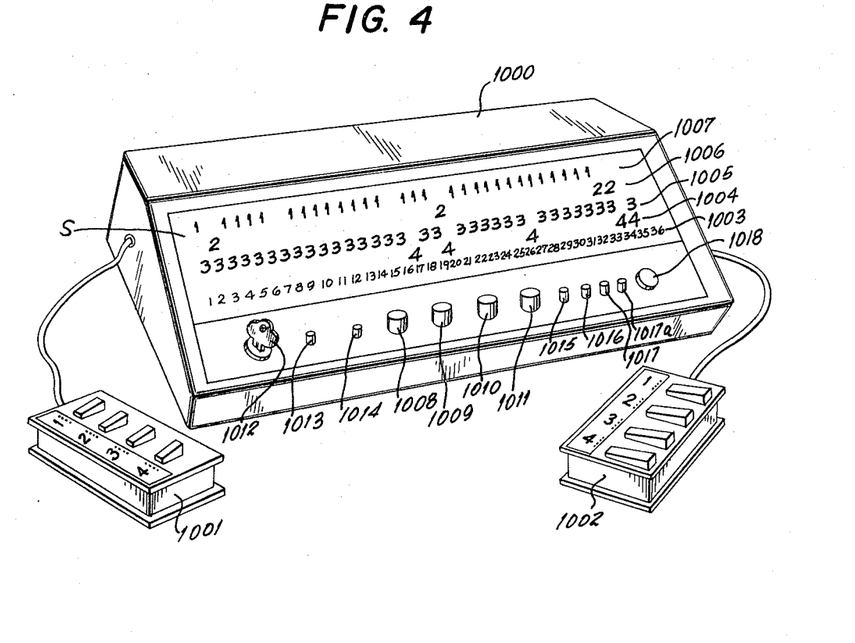
FIG. 4 is a perspective view of a master or instructor set and students sets.

With reference to FIG. 4, there is shown the instructor's set or master device or console 1000 including the apparatus of Columns II, III, IV, V of FIG. 2 and two students' sets 1001 and 1002. The top of set 1000 has on a screen S five rows of figures or characters 1003, 1004, 1005, 1006, 1007 of which row 1003 denotes the numbers of the 36 students of a class, while rows 1005 and 1007 denote the correct answers and rows 1004 and 1006 denote the incorrect or incomplete answers. The reference figures 1008, 1009, 1010, 1011 correspond respectively to the answer rows 1004, 1005, 1006, 1007. Buttons 1008 and 1010 may, for example, correspond to the rows of correct answers and buttons 1009 and 1011 to the rows of incorrect answers. However, many other variations are possible. The answer rows 1005 and 1007 and their corresponding buttons 1008 and 1010 can be of the same color, for example green, as the corresponding lamps of the apparatus, while the answer 1004 and 1006 and their corresponding buttons 1009 and 1011 can have the same color, red for example, as the corresponding lamps of the apparatus over which the characters are superposed.

The above description relates to an example wherein the correct answers are 1 and 3 and the incorrect answers are 2 and 4. Explained hereinafter is the working of the master device 1000 (FIG. 4) and of the student's sets 1001 and 1002.

When the instructor turns in the "key switch for overall switch-in and switch-out 1012" the master device 1000 and the student's sets are connected to the current source 10; the buttons 1008–1011 of the master device 1000 are illuminated in red but the screeen with the horizontal rows 1003–1007 are not lighted.

When anyone of the students operates one or a plurality of push-buttons 11–14 of his student's set, the figures relating to this student in the horizontal rows 1004–1007 corresponding to the push-buttons 11–14 (FIG. 2) operated by this student are illuminated, for example, in red. At this time, the instructor knows thus the answers given by each student and the speed of answer of each student. When the instructor introduces the correct answer in the master device by pushing one or more buttons 1008–1011 (1008 and 1010 in example shown on FIG. 4) the color of said buttons is changed, for example, to green and the color of the corresponding horizontal rows 1005 and 1007 also turns green. The other buttons 1009 and 1011 and the other horizontal rows 1004 and 1008 remain unchanged. At anytime before or after the instructor has pushed one or more buttons 1008–1011, each student can cancel his answer and can then push one or more push-buttons 11–14. The buttons 1008-1011 could be called "differentiation" buttons and are respectively associated with one signalling device 31–34.

Examining rows 1003 to 1007, it is seen that there were 27 answers showing the numbers 1 and 3, two incomplete answers from students 7 and 16 comprising only the number 3, five answers of numbers 2 and 3 from students, 2, 17, 27, 34, 36 and two answers of numbers 3 and 4 from students 20 and 35. This illustrates an advantage of the invention, which is the ease of simultaneous comparison of this large number of different answers obtained in a practically simultaneous manner. Further, such comparison is accomplished without peer approval complications, since one student will be unaware of the other's answers.

With regard to the remainder of the apparatus of FIG. 4.

1012 is the key switch for overall switch-in and switch-out of the apparatus; 1013 is a button for making the device work manually or automatically; 1014 is a wipe-out or back-to-zero button; 1015 is a button relating to use of transparencies; 1016 is a go-back button; 1017 and 1017-a are projector-lens adjusting buttons; and 1018 is a plug for linking the projector to the network.

Figure 5:
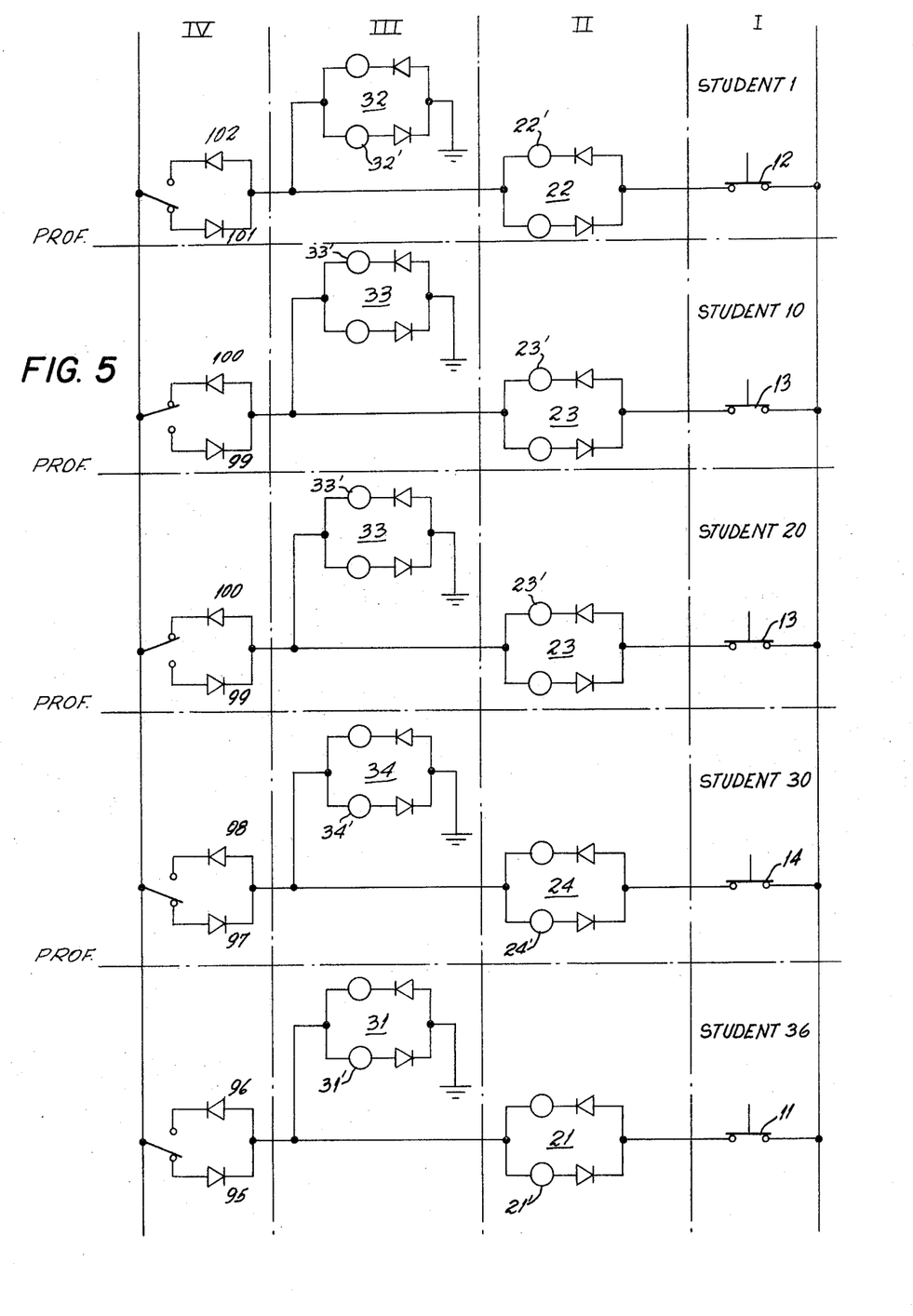
FIG. 5 is a schematic diagram illustrating correct and incorrect answers as detected by the present invention.

As to FIG. 5, this represents the result of an interrogation for five of the students from the class of 36, namely students 1, 10, 20, 30 and 36.

Thus, FIG. 5 is to some extent a summary of Columns I, II, III and IV of FIG. 2. For the five students in question, it follows that the instructor observes in Column II the appearance of, for example the wrong answers given by students 1, 30 and 36, while students 10 and 20 have given, for example, correct answers, namely:

Student 1 by pushing switch 12 has lit up the red lamp 22;

Students 10 and 20 by pushing switch 13 have lit up the green lamps 23';

Student 30 by pushing switch 14 has lit up the red lamp 24';

Student 36 by pushing switch 11 has lit up the red lamp 21'.

Quite clearly, the orientation of the diodes and the depressing of corresponding buttons by the teacher produces the above described light pattern.

In summary, the symbol "P" refers to differentiation means as clearly pointed out in the specification on page 2, lines 3–11, page 3, lines 16–31, and on page 4, lines 8–17. The differentiation means is based on a system or predetermined code of correct answers. The symbol "P" relates to the black-box concept of the combination of a switch and code system shown in FIGS. 2–5 all of which are operatively associated with the circuit "C" for indicating, by means of the lights, the correctness or incorrectness of the pupil's response.

The differentiation of the circuits is made for each circuit, thus allowing a red lamp or a green lamp to be lighted independently in each circuit. That means that the person under interrogation can light up one or more or even all of the lamps available to him. Similarly, the interrogator can select one or more or all of the contactors on his master board.

The question may arise as to why are there two identical sets of signalling devices 21–24 and 31–34 (columns II and III) at the instructor's position. The sets of signalling devices 21–24 and 31–34 are structurally identical but the functions are quite different. The sets of signalling devices 21–24 are directly connected to the corresponding push-buttons 11–14 of each student's set. There is therefore one set of signalling devices 21–24 for each student. There is only one set of signalling device 31–34 at the instructor's disposition which is coupled to all the sets of signalling devices 21–24 of all the students as can be seen from FIG. 5.

The apparatus of the present invention offers the following advantages:

1. In the case of there being a number of correct answers, these can be given in full: the student can operate one or more contactors depending on the number or degree of correct answers.
2. There can be a wider selection in combining the contactor codes. Thus for three contactors $a, b, c$, there is the choice of answers $a, b, c$; ab, ac, bc; abc, giving seven possibilities. Similarly with four contactors $a, b, c, d$, we will have: $a, b, c, d$; ab, ac, bc, bd, cd, abc, abd, acd, bcd; abcd; giving 15 possibilities. This means that with four contactors and only four wires (plus the common leads which are always identical) we have 15 answer alternatives.
3. The students have the chance of altering their answers. This is a very important factor and is the foundation of a new style of teaching called "directed instruction" (not to be confused with programmed instruction).
4. The sight of the simultaneous reaction of a group of students is a contribution wholly unknown until now and allows the instructor to have a permanent schedule on each student's acquired knowledge and that of the class as a whole.

Some answers can even be messages such as "I don't understand" or "I don't agree." Contemporary education requires constant participation of each member of the class and permanent correction of errors made. The introduction of a system allowing students to express themselves and alter their answers is the foundation of constructive teaching. Non-comprehension of a particular question does not explain the reason thereof.

In the present invention the teacher immediately determines the direction of the error made by one student or by the whole class.

Sample question:
"The lion is the king of the forest."
Parse the word LION
Answers:
1. subject
2. direct object
3. verb
4. indirect object
1.2. attribute
1.3. locative complement
1.4. temporal complement
2.3.4. I don't know
1.2.3.4. I don't agree Thus code can be used throughout the lesson, saving a great deal of time for the teacher and for his students. The teacher inserts the number corresponding to the right answer in his machine. Automatically in the above case, all numbers "1" will be green.

If a student answers "2" for instance, the corresponding station will be red, the teacher spots the mistake right away and will be able to give the student further information; the student can then correct himself thanks to the teacher's help. At the end of the session the screen can be made green all over.

What is claimed is:

1. Apparatus for the automatic and individual monitoring of replies in response to questions given by an examiner in an examination of a plurality of persons, said apparatus comprising a plurality of series each of at least three respective stations provided for said persons, the stations of said series being arranged in corresponding rows, each of said stations including respective illuminating means adapted for being actuated, said illuminating means including a pair of lights, one light for indicating a first condition and the other light for indicating a second condition, each of said stations provided for each person corresponding to a respective station provided for each other person, switching means associated with each of said lights at each station, a plurality of contactors provided for each person, the contactors for each said person being individually and concomitantly operable to permit a plurality of stations to be actuated, said contactors being electrically connected to a respective one of said stations of the series of the corresponding person to actuate the illuminating means thereof, and differentiation means provided for said examiner, said differentiation means including a plurality of further contactors electrically and respectively connected to each of said stations in one of said rows, said differentiation means being operatively associated with said switching means to determine the condition capable of being established at each of said stations, a plurality of cancelling means for cancelling the conditions established by respective of said persons under examination, said cancelling means being electrically connected to the first said contactors, and further cancelling means associated with said differentiation means and electrically connected to all of said contactors of the respective stations.

2. Apparatus as claimed in claim 1 including means for remotely controlling said contactors by said persons under examination.

3. Apparatus as claimed in claim 2 wherein said means for remotely controlling said contactors includes wires electrically connected to said contactors.

4. Apparatus as claimed in claim 1 wherein the lights of each said pair of signal lights differ in color from one another.

5. Apparatus as claimed in claim 1 comprising a console having said rows of said stations and a screen superposed on said stations and having rows of characters aligned with said pairs of lights.

6. Apparatus as claimed in claim 2, wherein said differentiation means is mounted on said console, comprising controls for the first said contactors arranged remotely of said console.

* * * * *

UNITED STATES PATENT OFFICE
CERTIFICATE OF CORRECTION

Patent No. 3,762,072  Dated October 2, 1973

Inventor(s) Joseph From

It is certified that error appears in the above-identified patent and that said Letters Patent are hereby corrected as shown below:

On the cover sheet the assignee should read

-- S. A. Leroli --.

Signed and sealed this 1st day of October 1974.

(SEAL)
Attest:

McCOY M. GIBSON JR.
Attesting Officer

C. MARSHALL DANN
Commissioner of Patents